(12) United States Patent
Ohashi et al.

(10) Patent No.: US 6,268,069 B1
(45) Date of Patent: Jul. 31, 2001

(54) JOINED ARTICLES AND A PROCESS FOR PRODUCING SUCH JOINED ARTICLES

(75) Inventors: Tsuneaki Ohashi, Ogaki; Tomoyuki Fujii, Nagoya, both of (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 09/271,965

(22) Filed: Mar. 18, 1999

(30) Foreign Application Priority Data

Mar. 27, 1998 (JP) .................................................. 10-098216

(51) Int. Cl.$^7$ .............................. B32B 15/04; C04B 37/02
(52) U.S. Cl. ...................... 428/621; 228/121; 228/123.1; 228/124.1; 403/272; 428/627; 428/629; 428/674; 428/472.2
(58) Field of Search ..................................... 428/621, 627, 428/629, 674, 472.2; 228/121, 123.1, 124.1; 403/272

(56) References Cited

FOREIGN PATENT DOCUMENTS

| 0 422 343 A1 | 4/1991 | (EP) . |
|---|---|---|
| 0 726 238 A2 | 8/1996 | (EP) . |
| 2-124778 | 5/1990 | (JP) . |
| 8-13280 | 1/1996 | (JP) . |
| 8-277171 | 10/1996 | (JP) . |

*Primary Examiner*—Deborah Jones
*Assistant Examiner*—Robert R. Koehler
(74) *Attorney, Agent, or Firm*—Burr & Brown (57) ABSTRACT

A process is disclosed for producing a joined article between a ceramic member and another member, which process includes the steps of brazing the ceramic member with another member by using a brazing material composed of 50 to 99 wt % of copper, 0.5 to 20 wt % of aluminum, 0.5 to 5 wt % of at least one kind of active metal selected from the group consisting of titanium, zirconium, hafnium, vanadium and niobium, thereby obtaining a joined body including the ceramic member, another member and a layer of the brazing material, and heating the brazing material layer in an oxidative atmosphere.

9 Claims, 6 Drawing Sheets

FIG_1

FIG_6

FIG_7

FIG_10a

FIG_10b

JOINED ARTICLES AND A PROCESS FOR PRODUCING SUCH JOINED ARTICLES

BACKGROUND OF THE INVENTOIN

(1) Field of the Invention

The present invention relates to joined articles between ceramic members and other members as well as to a process for producing such joined articles.

(2) Related Art Statement

A process for directly joining substrates made of aluminum nitride sintered bodies is known. For example, in JP-A 2-124778, aluminum nitride substrates are integrated to each other through diffusion joining by heating the substrates at 1800° C. to 1900° C. JP-A 8-13280 discloses a joined body of aluminum nitride sintered bodies having relatively high strength.

Further, a process for brazing a nitride ceramic member to another nitride ceramic member or a metallic member is known. For instance, JP-A 8-277171, discloses a joined article having high corrosion resistance against a halogen-based corrosive gas such as $ClF_3$ or the like by joining aluminum nitride members with a brazing material composed mainly of aluminum, copper or nickel and containing an active metal such as titanium. This brazing material is difficult to be corroded with the halogen-based corrosive gas, and easily wets the surface of the aluminum nitride member.

However, a problem exists in some uses. For example, in a semi-conductor-producing apparatus for a high temperature use, the joining layer joining the ceramic member to the metallic member is exposed to atmospheres inside and outside a semiconductor-producing chamber at temperatures not lower than 500° C. The atmosphere outside the chamber is open air or an inert gas, and that the inside chamber is medium or high degree vacuum, for example, into which a halogen-based corrosive gas or ozone is fed.

For example, since an aluminum-based brazing material has a high vapor pressure in a high temperature range of not less than 500° C., it is difficult to use. Further, since a silver-based brazing material, for example, a silver-copper-titanium based alloy brazing material also has a high vapor pressure in such a high temperature range of not less than 500° C., it is volatized under high vacuum, and is likely to be oxidized upon contacting the open air to shorten the service life of the brazing material.

SUMMARY OF THE INVENTOIN

It is an object of the present invention to enable a joined article composed of a ceramic member and another member via a layer of a metallic brazing material to maintain its joined state over a long time period even if the brazing material layer is exposed to an oxidative atmosphere, a high vacuum atmosphere, etc. at high temperatures.

The present invention relates to a process for producing a joined article between a ceramic member and another member, comprising the steps of brazing the ceramic member with said another member by using a brazing material composed of 50 to 99 wt % of copper, 0.5 to 20 wt % of aluminum, 0.5 to 5 wt % of at least one kind of active metal selected from the group consisting of titanium, zirconium, hafnium, vanadium and niobium, thereby obtaining a joined body including the ceramic member, said another member and a layer of the brazing material, and heating the brazing material layer in an oxidative atmosphere.

The present invention also relates to a joined article between a ceramic member and another member, said ceramic member and said another member being joined via a layer of a brazing material, said brazing material layer being composed of 50 to 99 wt % of copper, 0.5 to 20 wt % of aluminum, 0.5 to 5 wt % of at least one kind of active metal selected from the group consisting of titanium, zirconium, hafnium, vanadium and niobium and being heated in an oxidative atmosphere.

The present invention further relates to a joined article between a ceramic member and another member, said ceramic member and said another member being joined via a layer of a brazing material, said brazing material layer being composed of 50 to 99 wt % of copper, 0.5 to 20 wt % of aluminum, 0.5 to 5 wt % of at least one kind of active metal selected from the group consisting of titanium, zirconium, hafnium, vanadium and niobium, wherein the aluminum in the brazing material is diffused toward a side of a surface of the brazing material layer, and a passivated layer is formed on the surface side of the brazing material layer through the oxidation of the aluminum diffused.

The present invention further relates to a joined article to be attached to a semiconductor-producing chamber, said joined article comprising a ceramic member, another member and a layer of a brazing material joining the ceramic member to said another member, said brazing material layer being composed of 50 to 99 wt % of copper, 0.5 to 20 wt % of aluminum, 0.5 to 5 wt % of at least one kind of active metal selected from the group consisting of titanium, zirconium, hafnium, vanadium and niobium and being heated in an oxidative atmosphere, said brazing material layer being to be exposed to an oxidative atmosphere outside said chamber as well as to an atmosphere inside said chamber having a pressure lower than that of the atmosphere outside said chamber.

These and other objects, features and advantages of the invention will be well appreciated when taken in conjunction with the attached drawings, with the understanding that some modifications, variations and changes may be easily made by the skilled person in the art to which the invention pertains.

BRIEF DESCRIPTION OF THE DRAWINGS

For a better understanding of the invention, reference is made to the attached drawings, wherein.

DETAILED DESCRIPTION OF THE INVENTION

The present invention will be explained in more detail with reference to the attached drawings.

The present inventors discovered that when the brazing material having the above-specified composition range of the copper-aluminum-active metal based brazing material is used, wettability of the brazing material to the ceramic member is improved and the volatilization of the brazing material at high temperatures is suppressed. In addition, the inventors discovered that when a layer of the brazing material is exposed to an oxidative atmosphere at high temperatures, a passivated layer composed mainly of aluminum and oxide is produced in a surface portion of the brazing material layer, so that the brazing material layer exhibits extremely high corrosion resistance against the oxidative atmosphere, an ozone atmosphere and a halogen-based corrosive gas atmosphere at high temperatures.

In order to produce the above-mentioned passivated layer in the surface portion of the brazing material layer, the brazing material layer is exposed to an oxidative atmosphere, for example, open air at a temperature of 600° C. to 958° C. (preferably 800° C. to 958° C.).

After a joined article is produced by joining a ceramic member to another member, this joined article may be placed in a semiconductor-producing chamber without being exposed to the oxidative atmosphere at high temperatures. In this case, if at least the atmosphere outside the semiconductor-producing chamber is the oxidative atmosphere such as open air and the joined article is exposed to the temperature of 600° C. to 958° C. (preferably 800° C. to 958° C.), a passivated layer is produced in a surface portion of the brazing layer in an early stage after the joined article begins to be used. Thus, the effects aimed at by the present invention can be exhibited in this case, too.

As the ceramic member, ceramic materials having corrosion resistance against halogen-based corrosive gases are preferred. In particular, aluminum nitride or dense alumina are preferred, and an aluminum nitride-based ceramic and alumina having a relative density of not less than 95% are particularly preferred. A variety of additives such as a sintering aid and a colorant may be incorporated into the ceramic member. A sintered body produced by hot press sintering or hot isostatic press sintering is preferred as the ceramic member.

As another member, the above-mentioned ceramic materials or a metal having corrosion resistance against the halogen-based corrosive gas is preferred. In particular, a metal selected from the group consisting of nickel, copper, aluminum and their alloys is preferred.

A functional member such as a resistance heating element, an electro-static chucking electrode or a plasma-generating electrode may be buried in the ceramic member.

The present invention may be applied to a shadow ring, a high frequency plasma-generating tube, a high frequency plasma-generating dome, etc. As another member to be joined to the ceramic member, a ring made of a corrosive-resistant metal to attach a susceptor to a chamber is preferred.

Figure 1:
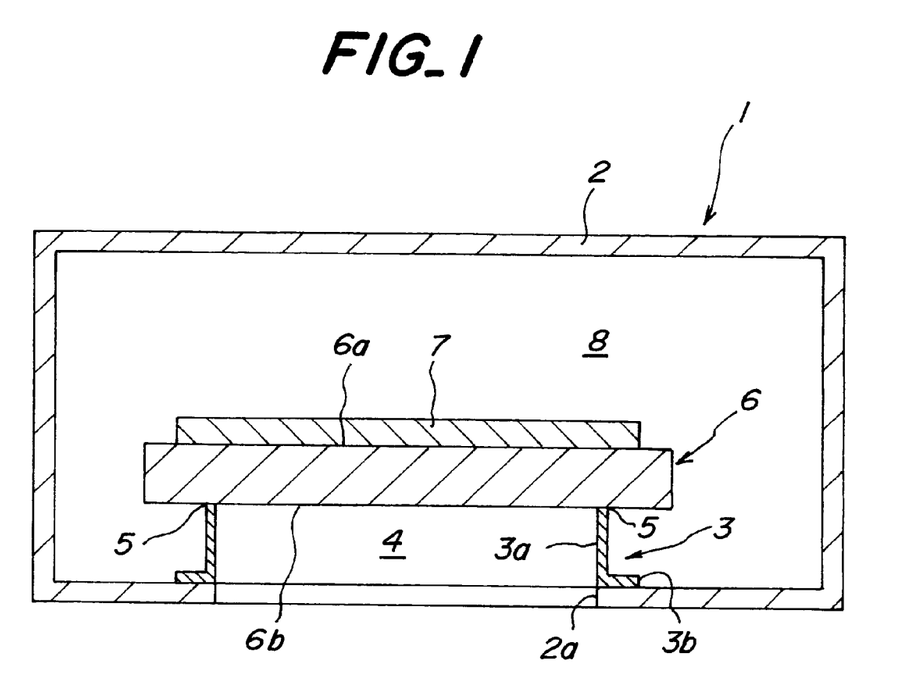
FIG. 1 is a sectional view for schematically illustrating a state in which a ring 3 and a susceptor 6 are attached to a chamber 2 of a semiconductor accommodating container 1.

For example, as schematically shown, a susceptor 6 is accommodated in a chamber 2 of a semiconductor-accommodating container 1, and a semi-conductor wafer 7 is placed on a wafer-placing face 6a of the susceptor 6. A cylindrical portion 3a of a ring 3 made of a corrosive-resistant metal is joined to a back face 6b of the susceptor 6. A reference numeral 5 indicates a joined portion. The ring 3 includes a flange portion 3b, which is joined to an inner face of the chamber 2. An opening 2a is provided at the chamber. The joined portion 5 between the ring 3 and the susceptor 6 is exposed to an atmosphere 8 inside the chamber and that 4 outside the chamber.

Into the brazing material needs to be included 50 to 99 wt % of copper. If the content of copper exceeds 99 wt %, a joining effect of the aluminum metal or a joining effect of the active metal does not appear. If the content is less than 50 wt %, the desired melting point cannot be obtained, and reduction in the residual stress of the joined article cannot be expected. If the content of aluminum is less than 0.5 wt %, the surface of the brazing material layer cannot be fully covered with a protective film of aluminum oxide. If the content is more than 20 wt %, the same defects as in the case of Cu being less than 50 wt % may occur. Preferably, copper is in a range of 80 to 95 wt %, and aluminum is in a range of 1.0 to 10 wt %.

At least one kind of active metal selected from the group consisting of titanium, zirconium, hafnium, vanadium and niobium needs to be contained in the brazing material. Wettability of the ceramic member can be remarkably improved by setting the content of at least one kind of the active metal to not less than 0.5 wt % (preferably not less than 1.0 wt %). On the other hand, the corrosion resistance of the ceramic member against the oxidative atmosphere and the halogen-based corrosive gas atmosphere can be further improved by setting the content of at least one kind of the active metal to not more than 5 wt %(preferably not more than 3 wt %).

Among the above active metal, titanium is particularly preferred.

Silicon or boron may be contained as a fourth ingredient in the brazing material. Such a fourth ingredient functions to decrease the melting point of the brazing material. If the fourth ingredient is incorporated into the brazing material, fluidability of the brazing material having the melting point lowered is improved even at the same joining temperature. If the content of the fourth ingredient exceeds 20 wt %, the corrosion resistance of the joining layer is deteriorated. Thus, the content of the fourth ingredient is preferably not more than 20 wt %, and more preferably 1 to 12 wt %.

The thickness of the passivated layer in the brazing material layer is preferably not less than 0.1 μm, more preferably not less than 1.0 μm from the standpoint of oxidation resistance. The thickness is further preferably not more than 100 μm, more preferably not more than 50 μm from the standpoint of the joining strength.

The heating condition under which the brazing material is oxidized under heating is not more than the temperature of the solidus of the brazing material, preferably not more than 958° C. Further, the heating temperature is preferably not less than 800° C., more preferably not less than 850° C. For example, it is preferable that the oxidation treatment is effected, for example at 800° C. for not less than one hour to five hours or at 850° C. for not less than 0.2 hours to 2 hours or at 900° C. for 0.2 hours to 0.5 hours.

EXAMPLES

In the following, specific examples of the present invention will be explained.

A discoid ceramic susceptor and a ring as shown in FIG. 1 were joined according to the method of the present invention. The susceptor was made of a sintered body of aluminum nitride having purity of 99.9 wt % and a density of 3.26/cm$^3$ with a configuration of 208 mm in diameter×10 mm in thickness. The ring was made of KOVAR (a Fe-Ni-Co alloy containing 27–31 wt. % Ni, 15–19 wt. % Co and the remainder Fe), and had an outer diameter of 200 mm, an inner diameter of 198 mm and a height of 20 mm.

A back face of the susceptor was opposed to an end face of the ring, while a brazing material was interposed between them. The composition of the brazing material was 92.75 wt % of copper, 2 wt % of aluminum, 2.25 wt % of titanium and 3 wt % of silicon. The thus formed assembly was held at 1050° C. for 10 minutes, thereby obtaining a joined product through brazing the susceptor to the ring.

Figure 2:
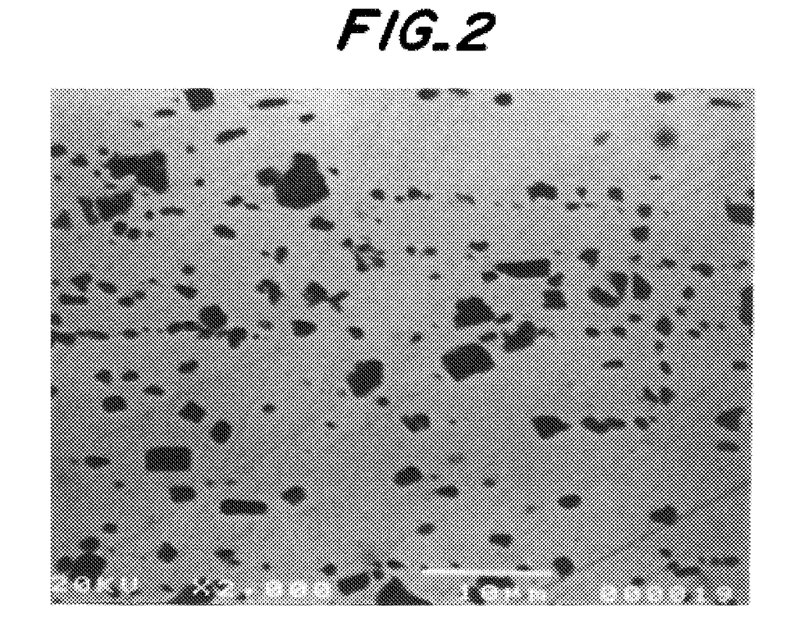
FIG. 2 is a scanning type electron microscopic photograph of a layer of a brazing material located at a joining portion of a joined body immediately after brazing.

A sectional face of the brazing material layer present in the joining portion of the joined product immediately after the above brazing was polished, and the polished face of the brazing material was observed by taking a scanning type electron photomicrograph. In FIG. 2 is given an electron photomicrograph of the brazing layer. The brazing material layer immediately after the brazing was divided into gray matrix (continuous phase) and granular, black dispersion phases in the matrix. The composition of each of the respective phases was determined with DES, and is shown in Table 1.

TABLE 1

|  | Cu | Al | Ti | Si |
|---|---|---|---|---|
| Matrix (grey) | 87.7 | 4.63 | 2.41 | 5.26 |
| Dispersed phase (black) | 46.83 | — | 32.37 | 20.8 |

Next, the joined product was subjected to the oxidation treatment at a temperature for a time period in air as given in Table 2. The appearance of the thus obtained joined article was visually observed. Further, a sectional face of the brazing material layer present in the joining portion of the joined article was polished, and the polished face of the brazing material was observed with the scanning type electron microscope, and the thickness of a film present at a surface of the brazing material was measured. Resulting measurement results are shown in Table 2.

TABLE 2

| | Oxidizing temperature (° C.) | Oxidizing time period (hrs) | Thickness of passivated layer (μm) | Appearance |
|---|---|---|---|---|
| 1 | 800 | 0.2 | not observed | color almost not changed |
| 2 | 800 | 1.0 | 0.1 | color almost not changed |
| 3 | 800 | 5.0 | 0.2 | color changed |
| 4 | 800 | 100 | 3.0 | color changed |
| 5 | 850 | 0.2 | 0.35 | color changed |

TABLE 2-continued

| | Oxidizing temperature (° C.) | Oxidizing time period (hrs) | Thickness of passivated layer (μm) | Appearance |
|---|---|---|---|---|
| 6 | 850 | 5.0 | 0.65 | color changed |
| 7 | 850 | 20.0 | 1.07 | color changed |
| 8 | 900 | 0.2 | 0.51 | color changed |
| 9 | 900 | 5.0 | 1.2 | color changed |
| 10 | 900 | 20.0 | measurement impossible | brazing material corroded |
| 11 | 1000 | 0.2 | measurement impossible | brazing material half-melted |

As mentioned above, it was discovered that when the oxidation treatment was effected in a temperature of 800° C. to 900° C., while the oxidizing time period was controlled, a passivated layer could be formed in a thickness of 0.1 μm to 3.0 μm on the surface of the brazing material layer. This passivated layer could be visually observed as a color change at the surface of the brazing material layer. When the heat treatment was effected at 800° C. for 0.2 hours, such an oxidized layer could not be clearly observed. When the heat treatment was effected at 900° C. for 20 hours, the surface of the brazing material layer was corroded, and countless uneven portions were formed. When the heating treatment was effected at 1000° C. for 0.2 hours, the brazing material was half melted.

Figure 3:
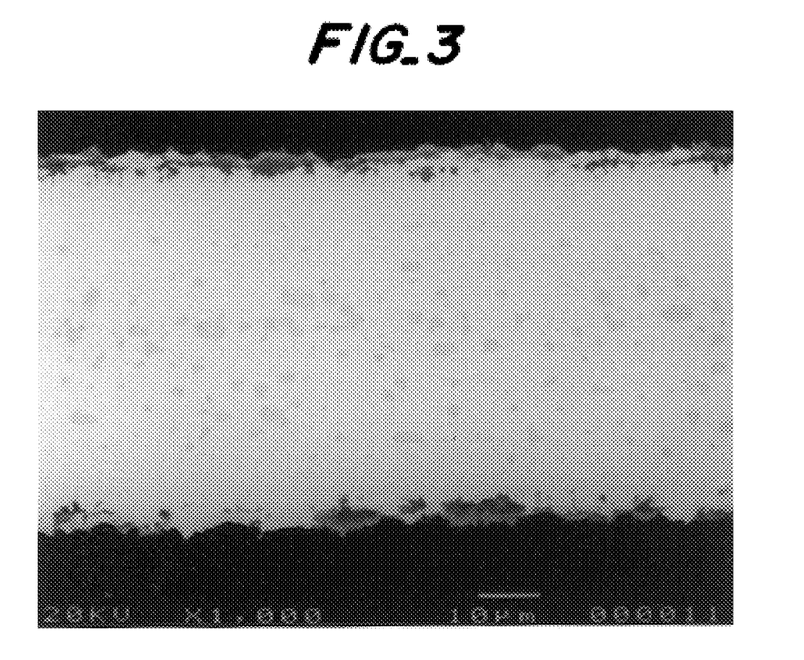
FIG. 3 is a is a scanning type electron microscopic photograph of the brazing material layer after the treatment of the joined body of FIG. 2 at 800° C. in air for 100 hours.

FIG. 3 shows a scanning type electron photomicrograph of a section of an example (Experiment No. 4) in which oxidation treatment was effected at 800° C. for 100 hours. This sectional electron photomicrograph reveals that the brazing material layer immediately after brazing was changing. That is, a passivated layer was clearly produced on a surface side of the brazing material layer. With this, a portion of the brazing material layer inside the oxidized layer is composed of a matrix (continuous phase) and dispersed phase, and the matrix changed white, while the dispersed layer changed gray. Table 3 shows measurement results of the composition of each phase.

TABLE 3

|  | Cu | Al | Ti | Si |
|---|---|---|---|---|
| Matric (grey) | 87.82 | — | 4.19 | 7.99 |
| Dispersed phase (black) | 56.7 | — | 26.72 | 16.58 |

It is seen that aluminum disappeared in the matrix and the dispersed phases, and instead diffused into the surface side of the brazing material layer to produce the passivated layer.

Durabilty Test at a High Temperature Under Vacuum

A sample in each of Experiment Nos. 4 and 7 was held at 500° C. for 100 hours in an atmosphere of 1×10$^{-9}$ Torr. Then, sealingness of a joined portion 5 between a susceptor and a ring as shown in FIG. 1 was evaluated with a helium leak measuring apparatus, which revealed that the helium leaked amount was less than 1×10$^{-8}$ Torr·1/s before and after the durability test and that no deterioration in the sealingness even after the durability test was observed. (Durability test at a high temperature in an oxidative atmosphere)

A sample in each of Experiment Nos. 4 and 7 was held at 700° C. for 100 hours in air. Then, sealingness of a joined portion 5 between a susceptor and a ring as shown in FIG. 1 was evaluated with a helium leak measuring apparatus, which revealed that the helium leaked amount was less than $1\times10^{-8}$ Torr·1/s before and after the durability test and that no deterioration in the sealingness even after the durability test was observed.

COMPARATIVE EXAMPLE

In the above brazing step, a brazing material composed of 63 wt % of silver, 35.25 wt % of a copper and 1.75 wt % of titanium was used. Brazing was effected at a brazing temperature was 850° C. for a holding time of 10 minutes, thereby obtaining a joined product as a comparative example.

Each of the thus obtained joined products was subjected to the above durability test at the high temperature under vacuum or the above durability test at the high temperature in the oxidative atmosphere. Results showed that the helium leaked amount was less than $1\times10^{-8}$ Torr·1/s before the durability test, but more than $1\times10^{-7}$ Torr·1/s after the durability test. Thus, deterioration in the sealingness was observed. The reason why the sealingness was deteriorated is considered to be the volatilization of silver in the case of the vacuum test and the progress in oxidation of the brazing, material layer due to a lack of a protective film in the case of the oxidation test.

Preferred Embodiments of Joined Portions

Each of FIGS. 4 to 10 shows by way of example a preferred joined embodiment of the joined articles according to the present invention.

Figure 4:
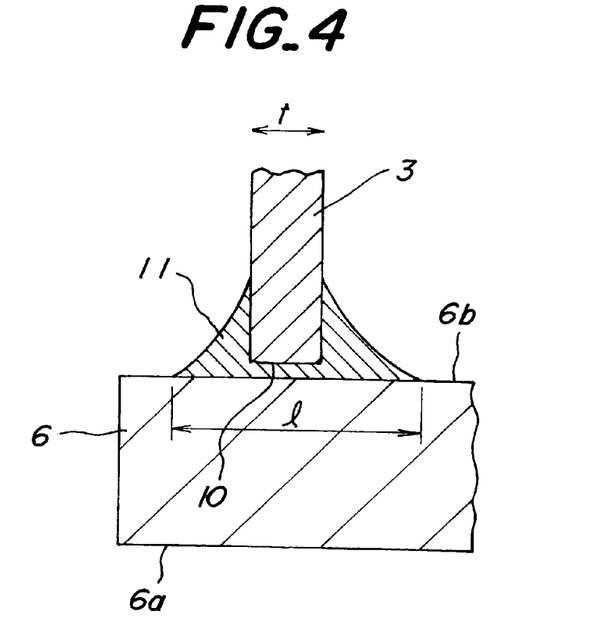
FIG. 4 is a sectional view of a part of a preferred joined state of a ring 3 and a susceptor 6.

In the joined state of FIG. 4, an end face 10 of a ring 3 is joined to a back face 6*b* of a susceptor 6. In each of FIGS. 4 to 10, the ring is preferably made of KOVAR (a Fe-Ni-Co alloy containing 27–31 wt. % Ni, 15–19 wt. % Co and the remainder Fe), while the susceptor is preferably made of aluminum nitride. A value (1/t) obtained by dividing the width "1" of the brazing material layer 11 by the thickness "t" of the ring 3 is preferably not less than 1.5 to not more than 20, and more preferably not less than 2 and not more than 10. In this case, thermal stress occurring in the joined portion 5 is likely to be mitigated.

Figure 5:
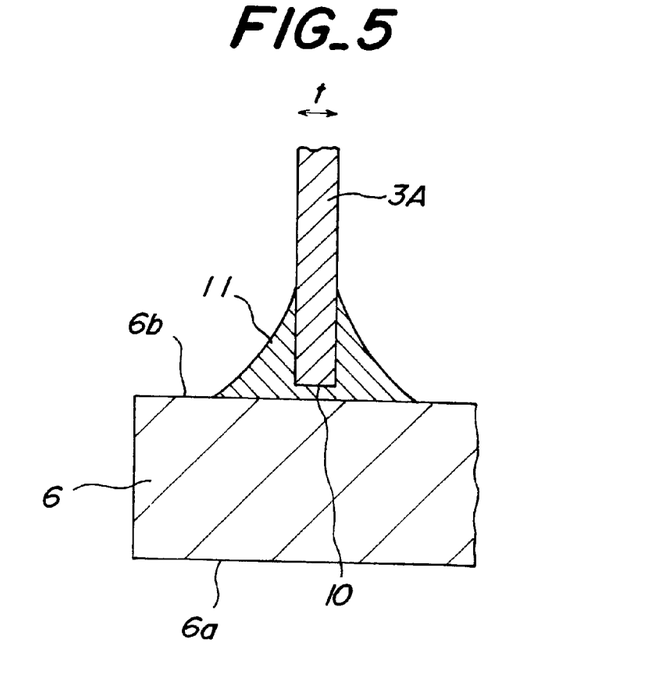
FIG. 5 is a sectional view of a part of another preferred joined state of a ring 3A and a susceptor 6.

In the joined state of FIG. 5 in which the thickness "t" of the ring 3A is 0.8 mm, thermal stress occurring in the joined portion 5 can be further mitigated. Ordinarily, the thickness of the ring is not less than 1.0 mm.

As shown in FIGS. 6 to 9, if a cut face or an R face is formed at the surface of the ring and/or the surface of the susceptor at which the brazing material layer is provided, the fillet profile of the brazing layer can be controlled to reduce the residual stress at the joined portion.

Figure 6:
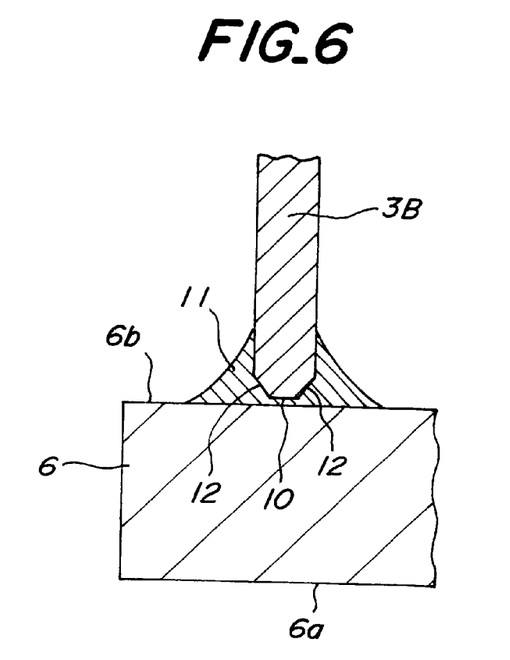
FIG. 6 is a sectional view of a part of a further preferred joined state of a ring 3B and a susceptor 6 in which cut faces 12 are formed at the ring 3B.
Figure 7:
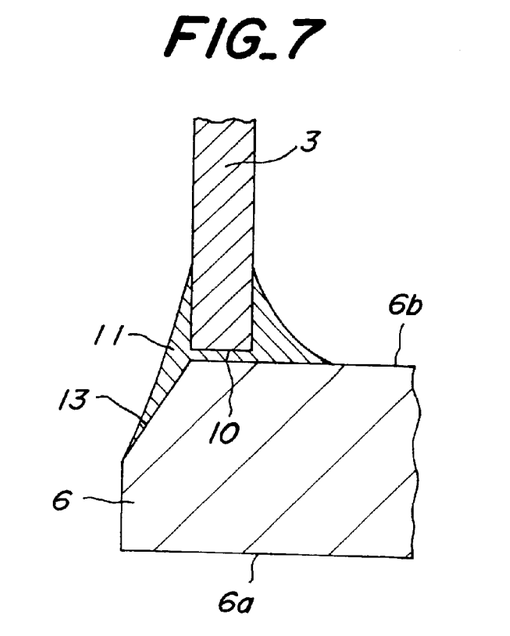
FIG. 7 is a sectional view of a part of a still further preferred joined state of a ring 3 and a susceptor 6 in which a cut face 13 is formed at an outer peripheral portion of the susceptor 6.

For example, as shown in FIG. 6, a C face 12 can be formed at a side of an end face 10 of the ring 3B. As shown in FIG. 7, if a cut face 13 is formed at a side of an outer peripheral surface of the susceptor 6, the thickness of the brazing layer 11 gently decreases to reduce residual stress.

Figure 8:
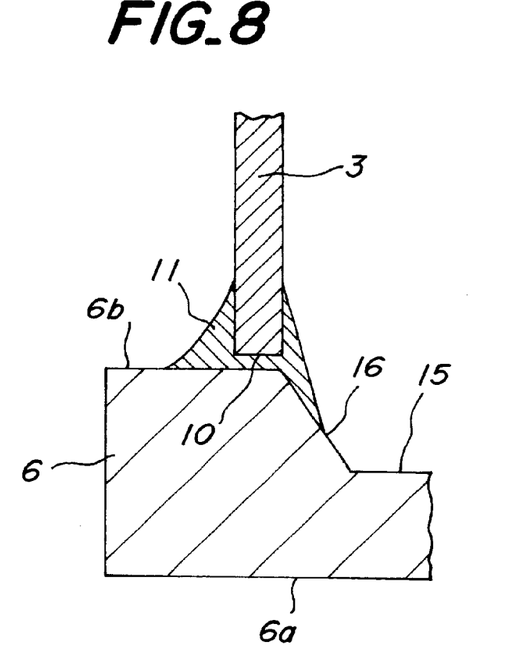
FIG. 8 is a sectional view of a part of a still further preferred joined state of a ring 3 and a susceptor 6 in which a depression 15 and a peripheral cut face 16 are formed in a portion of the susceptor 6 inside of the ring.
Figure 9:
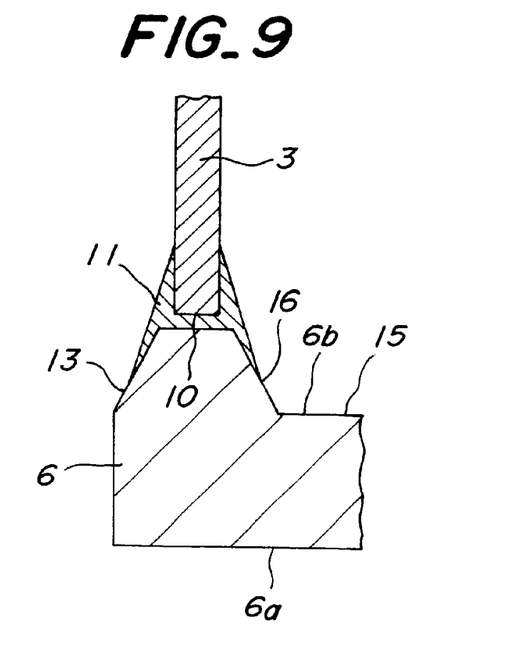
FIG. 9 is a sectional view of a part of a still further preferred joined state of a ring 3 and a susceptor 6 in which a cut face 13 is formed at an outer peripheral portion of the susceptor 6 and a depression 15 and a peripheral cut face 16 are formed in a portion of the susceptor 6 inside the ring.

As shown in FIG. 8, it may be that a depression 15 having a round shape as viewed in plane is formed in an inner surface side, and that a C face 16 is formed at a peripheral edge of the depression 15. A portion of the brazing material layer 11 is located at the C face 16. As shown in FIG. 9, the susceptor 6 may be provided with all of a C face 13 at an outer peripheral side, a round depression 15 and a C face 16 at an inner side. As matter of course, a C face and an R face may be provided in each of the embodiments in FIGS. 7, 8 and 9.

Figure 10A:
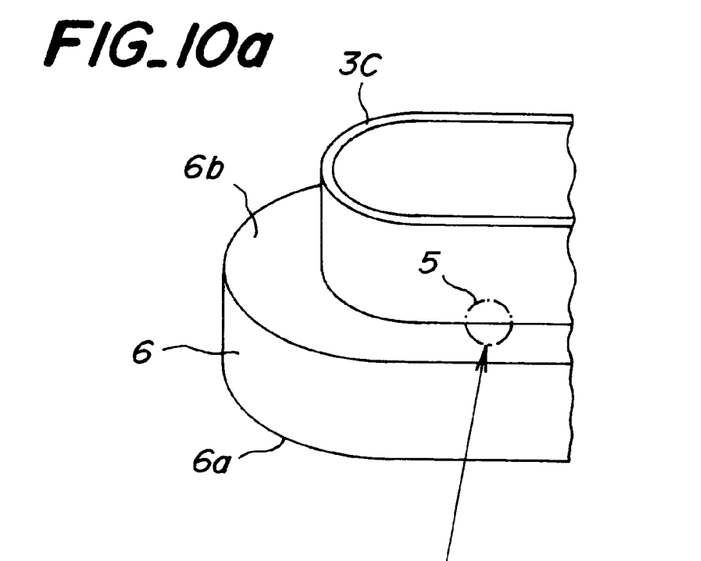
FIGS. 10(a) and (b) show a part of a still further preferred joined state of a ring 3C and a susceptor 6 in which uneven portions are formed at a joined portion between the ring 3C and the susceptor.
Figure 10B:
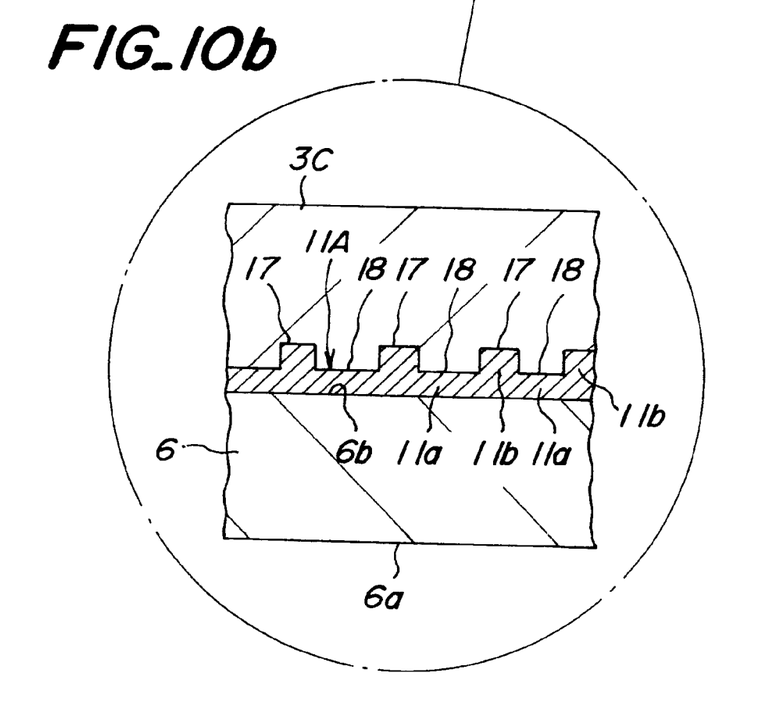

An uneven portion may be provided at a ring and/or a susceptor at a joined portion between the ring and the susceptor. For example, in FIG. 10, an uneven portion is provided at a joined portion between the ring 3C and the back face of the susceptor, preferably over the entire circular end face of the ring 3C. Reference numerals 17 and 18 denote a depression and a projection, respectively, which are alternatively repeated. Correspondingly, thick portions 17 and thin portions 18 are alternatively repeated in the brazing material layer 11. By adopting such a structure, a vacuum degree can be easily raised in brazing, so that disorder in wetting the members with the brazing material hardly occurs.

As mentioned above, according to the present invention, when the joined body is obtained by joining the ceramic member and another member to each other with a layer of the metallic brazing material, the joined state can be maintained over a long time period even if the brazing material layer is subjected to high temperatures in the oxidative atmosphere or high vacuum atmosphere.

What is claimed is:

1. A process for producing a joined article between a ceramic member and another member, comprising the steps of brazing the ceramic member with said another member by using a brazing material comprising 50 to 99 wt % of copper, 0.5 to 20 wt % of aluminum, and 0.5 to 5 wt % of at least one metal selected from the group consisting of titanium, zirconium, hafnium, vanadium and niobium, thereby obtaining a joined body including the ceramic member, said another member and a layer of the brazing material, and heating the brazing material layer in an oxidative atmosphere.

2. The joined article-producing process set forth in claim 1, wherein the brazing material layer is heated after the brazing, at a temperature not higher than a solid phase line of the brazing material in the oxidative atmosphere.

3. The joined article-producing process set forth in claim 1, wherein the ceramic member is made of aluminum nitride, and said another member is of Fe-NI-Co alloy.

4. A joined article between a ceramic member and another member, said ceramic member and said another member being joined via a layer of a brazing material, said brazing material layer comprising 50 to 99 wt % of copper, 0.5 to 20 wt % of aluminum, and 0.5 to 5 wt % of at least one metal selected from the group consisting of titanium, zirconium, hafnium, vanadium and niobium and being heated in an oxidative atmosphere.

5. A joined article between a ceramic member and another member, said ceramic member and said another member being joined via a layer of a brazing material, said brazing material layer comprising 50 to 99 wt % of copper, 0.5 to 20 wt % of aluminum, and 0.5 to 5 wt % of at least one metal selected from the group consisting of titanium, zirconium, hafnium, vanadium and niobium, wherein the aluminum in the brazing material is diffused toward a side of a surface of the brazing material layer, and a passivated layer is formed on the surface side of the brazing material layer through the oxidation of the aluminum diffused.

6. The joined article set in claim 4, which is to be attached to a semiconductor-producing chamber.

7. The joined article set forth in claim 6, wherein the brazing material layer is to be exposed to an inactive or oxidative atmosphere outside said chamber as well as to an atmosphere inside said chamber having a pressure lower than that of the atmosphere outside said chamber.

8. A joined article to be attached to a semiconductor-producing chamber, said joined article comprising a ceramic member, another member and a layer of a brazing material joining the ceramic member to said another member, said brazing material layer comprising 50 to 99 wt % of copper, 0.5 to 20 wt % of aluminum, and 0.5 to 5 wt % of at least one metal selected from the group consisting of titanium, zirconium, hafnium, vanadium and niobium and heated in an oxidative atmosphere, said brazing material layer being to be exposed to an oxidative atmosphere outside said chamber as well as to an atmosphere inside said chamber having a pressure lower than that of the atmosphere outside said chamber.

9. The joined article set forth in claim 4, wherein the ceramic member is made of aluminum nitride, and said another member is of Fe-Ni-Co alloy.

* * * * *